March 15, 1938.　　　　　J. E. EUTH　　　　　2,111,319
CASH RECEPTACLE
Filed May 7, 1934　　　　　6 Sheets-Sheet 1
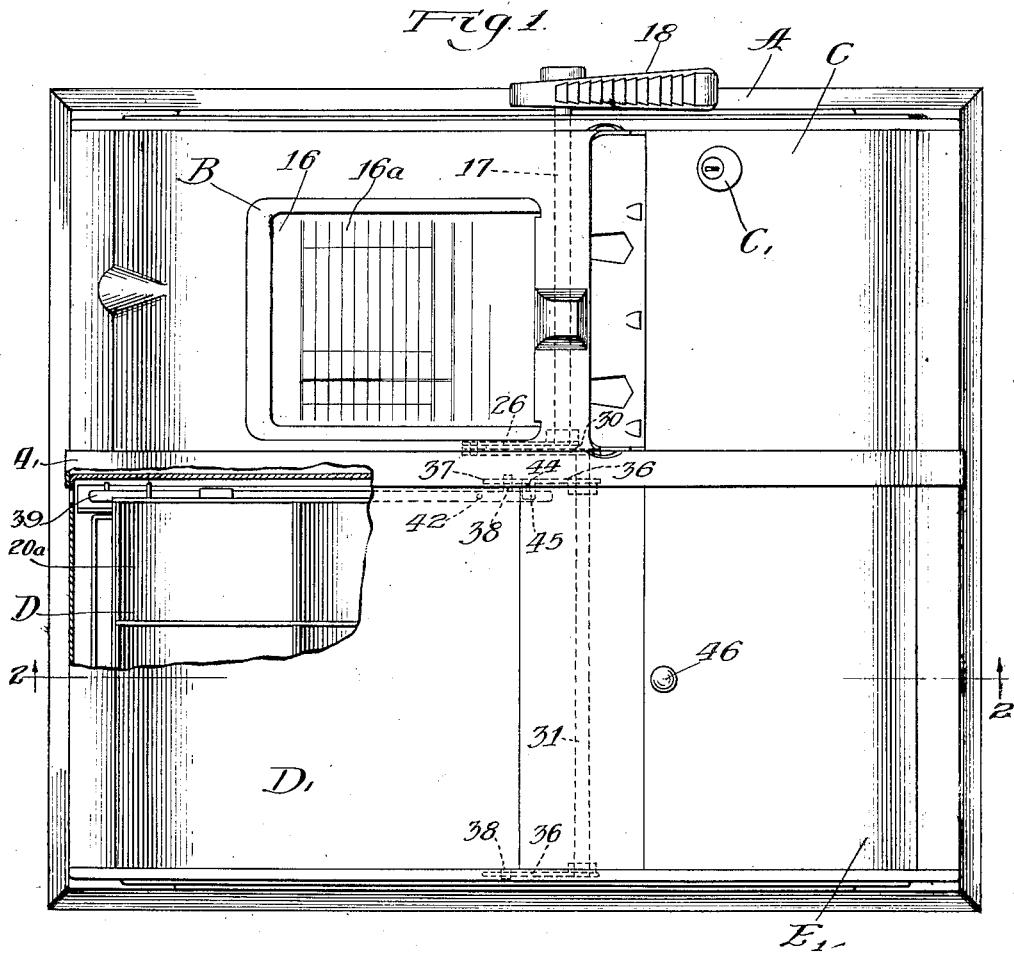
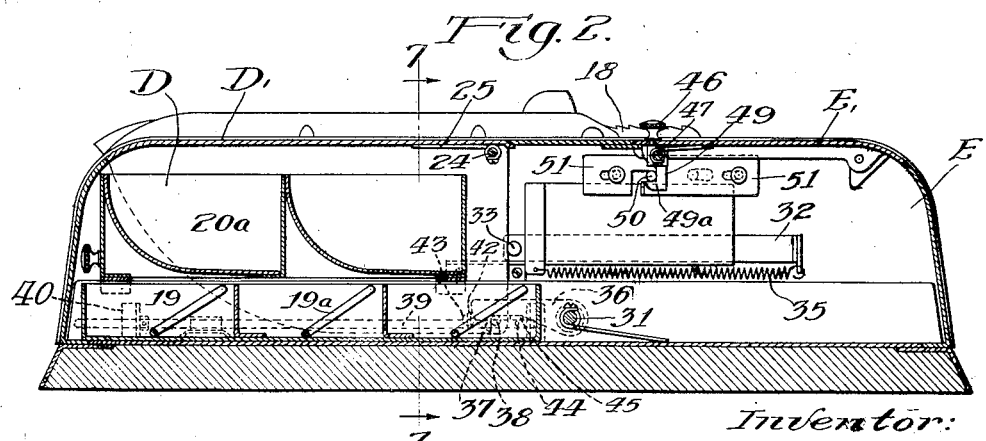

March 15, 1938.  J. E. EUTH  2,111,319
CASH RECEPTACLE
Filed May 7, 1934    6 Sheets-Sheet 2
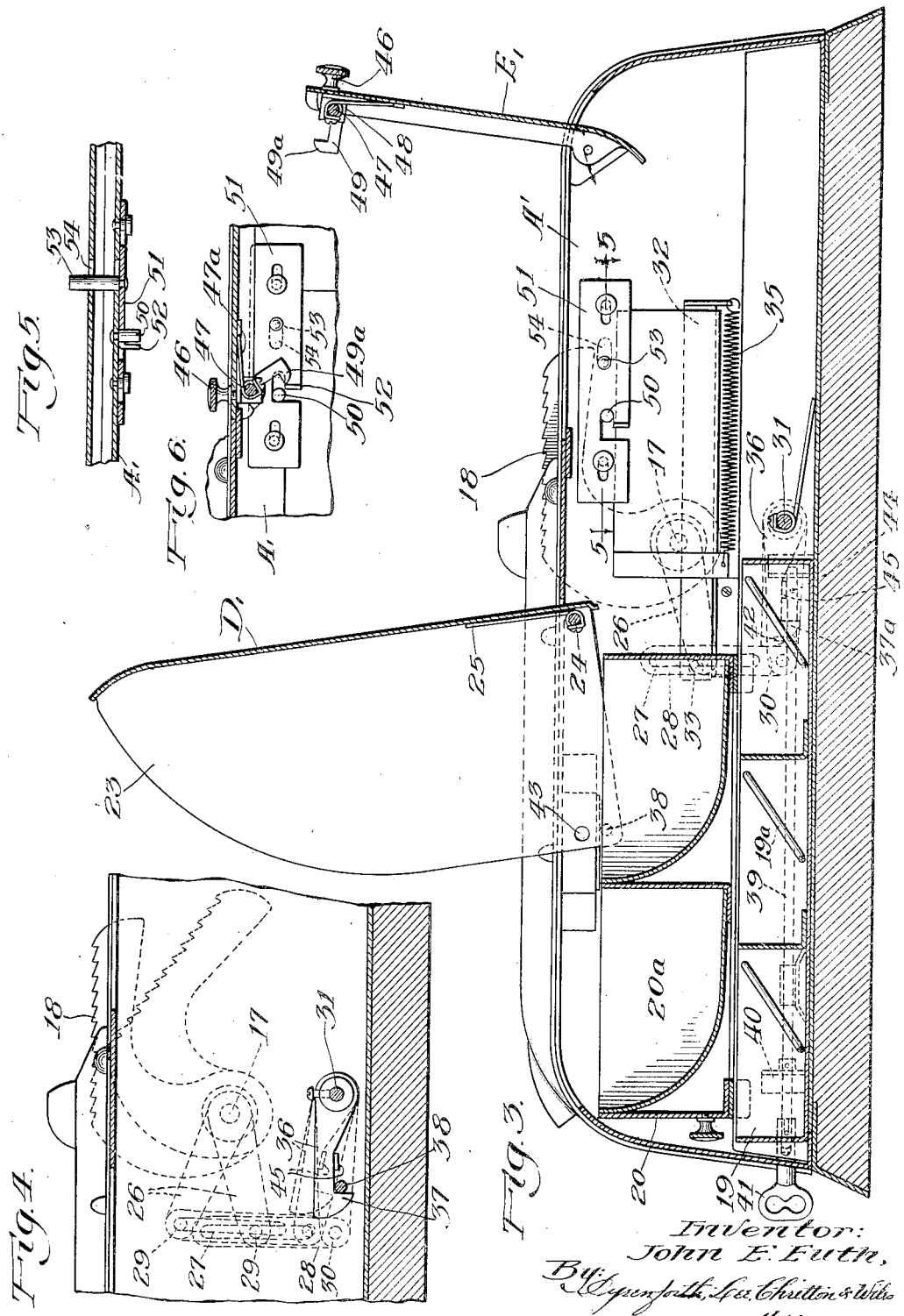

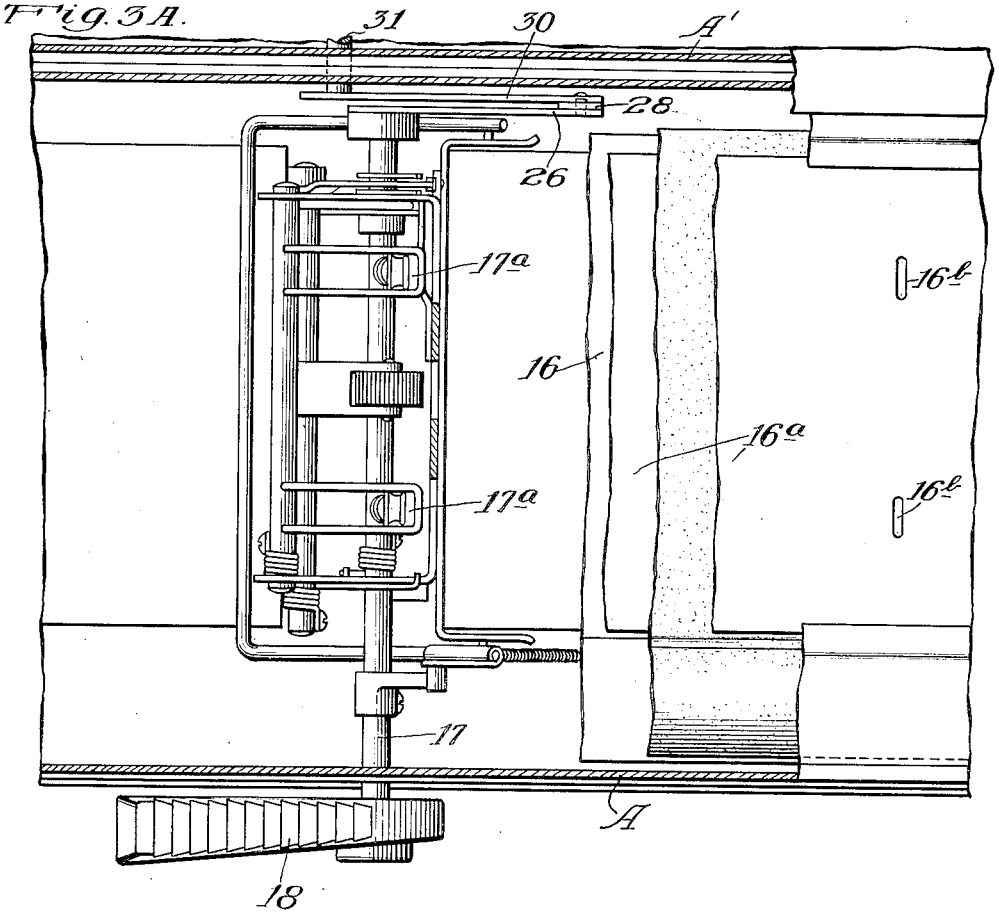
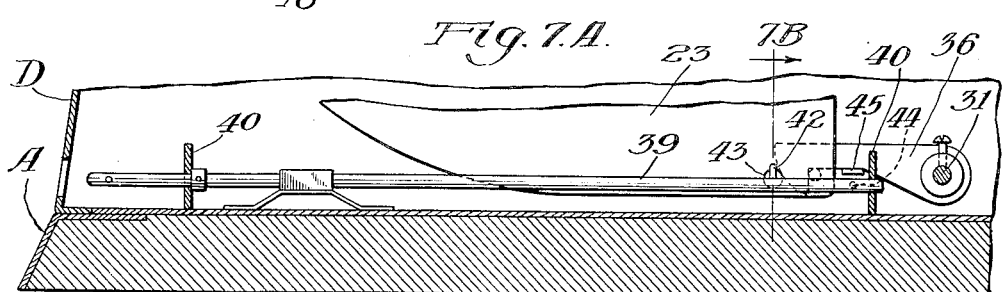
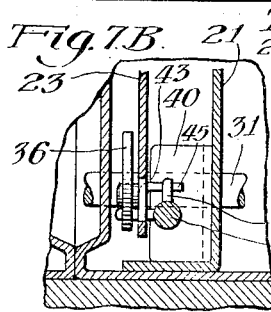
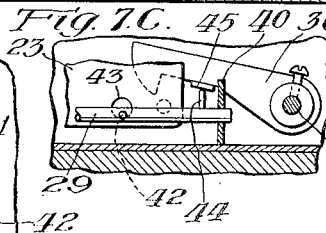
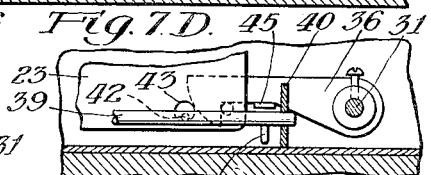

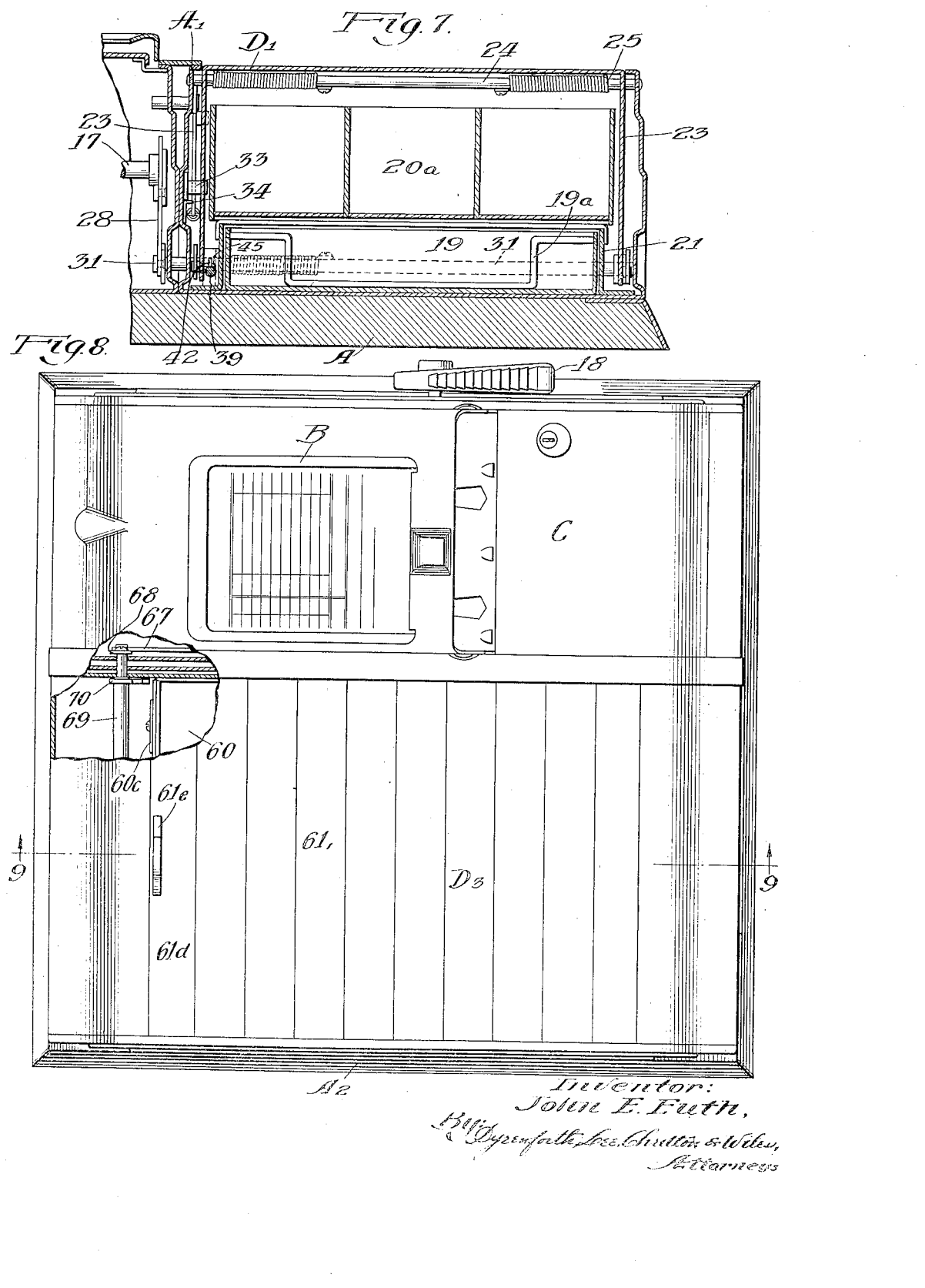

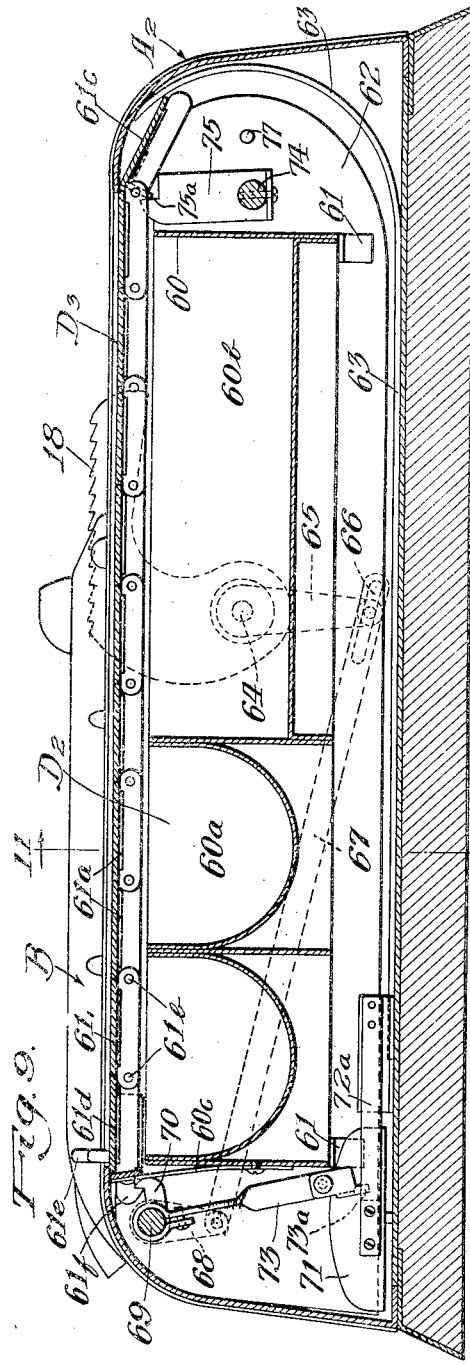

March 15, 1938. J. E. EUTH 2,111,319
CASH RECEPTACLE
Filed May 7, 1934 6 Sheets-Sheet 6
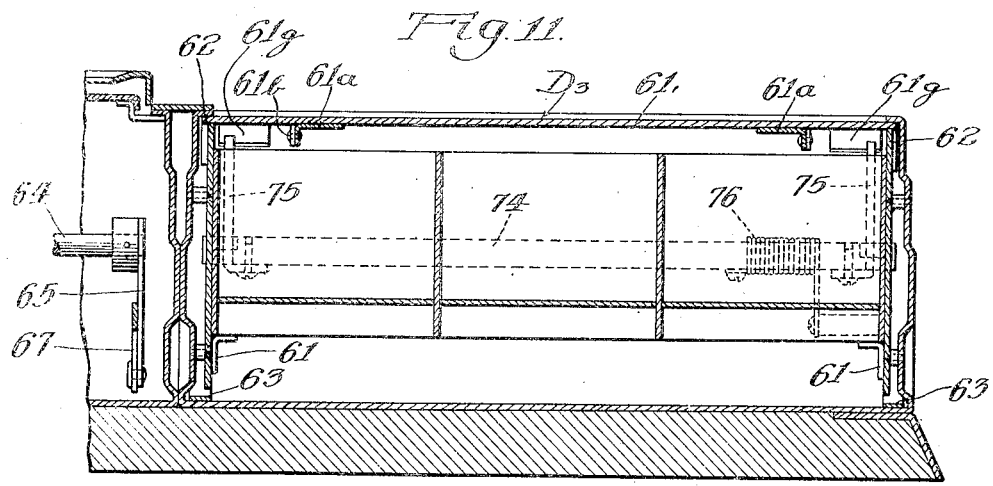
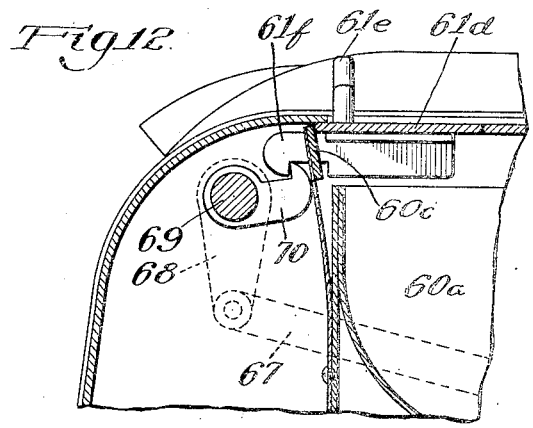
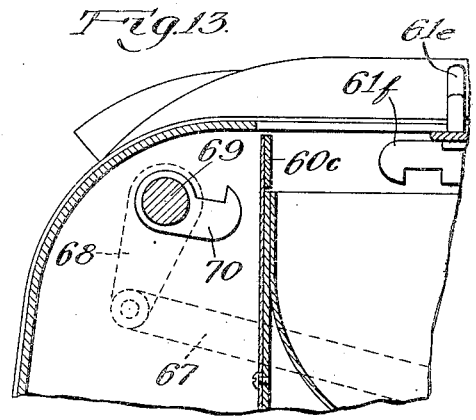
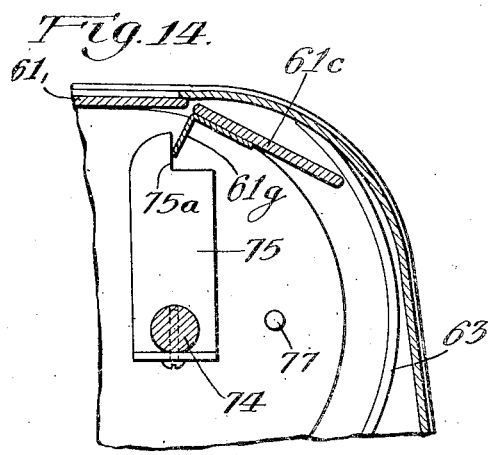
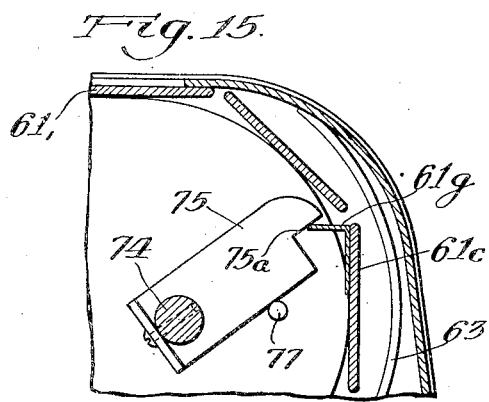
Inventor:
John E. Euth,
By Dyrenforth, Lee, Chritten&Wiles
Attorneys Patented Mar. 15, 1938

2,111,319

UNITED STATES PATENT OFFICE 2,111,319

CASH RECEPTACLE

John E. Euth, Chicago, Ill., assignor to United Autographic Register Co., Chicago, Ill., a corporation of Illinois Application May 7, 1934, Serial No. 724,424

1 Claim. (Cl. 235—5)

This invention relates to cash receptacles and, more particularly, to a cash receptacle operatively associated with autographic register means. In a preferred embodiment of my invention, the cash receptacle and register equipped with a platen are laterally disposed in a unitary structure having manually operable means to move stationery strips across the platen and to render the contents of the cash receptacle available.

An object is to provide a closed cash receptacle with a simple mechanism cooperating with an autographic register device adapted to render the contents of said receptacle available after the operator has completed the registering step. A further object is the devising of a receptacle occupying a minimum space both in closed and open position.

In the preferred embodiment of the invention, such as illustrated in the accompanying drawings, an autographic register, having a platen-forming top and a record compartment, and a cash receptacle are laterally disposed in a unitary device; an oscillating member having a limited stroke and equipped with register pins and a lost-motion connection advances stationery strips over the platen and in the same stroke opens the cash box.

In the drawings, three cash-retaining devices embodying the invention are shown; in each embodiment, the recording means are substantially the same.

The embodiment which is at present preferred is illustrated in Figs. 1–7D, inclusive, and the cash receptacle is equipped with a cover pivotally mounted and adapted to conceal the contents of the receptacle from a customer standing in front of a counter on which the receptacle rests, even when the cover is open. The cover is provided with means adapted to releasably engage means mounted on the strip-actuating member of the register. Closure locking means, independently controlled, are preferably associated with said latching device.

In the embodiment of Figs. 8 to 15, the cash receptacle is closed by rolled top means.

In each embodiment, the actuating shaft preferably extends transversely with reference to the direction of movement of the stationery strip and has an operating lever disposed adjacent the lateral edge of the register casing, the hand lever being preferably located conveniently for operation by the left hand of the salesman after he has completed his entry.

In the drawings, Figure 1 is a plan view, partly broken, of a preferred embodiment of the invention; Fig. 2, a longitudinal sectional view taken along line 2—2 of Fig. 1; Fig. 3, a similar view on an enlarged scale of Fig. 2, showing the cash receptacle closure means in open position; Fig. 3A, a broken plan view showing the paper feed mechanism of an autographic register; Fig. 4, a detail view of a lost-motion connection; Fig. 5, a detail view along line 5—5 of Fig. 3; Fig. 6, a vertical sectional view of the deposit chamber latching means; Fig. 7, an enlarged vertical sectional view along line 7—7 of Fig. 2; Fig. 7A, a broken longitudinal sectional view showing the closure latching device and key-shaft in neutral position; Fig. 7B, a broken sectional view, taken as indicated at line 7B of Fig. 7A; Fig. 7C, a fragmentary view of the latching device in Fig. 7A, showing the key-shaft in unlocking position; Fig. 7D, a similar view showing the key-shaft in locked position; Fig. 8, a plan view, partly broken, of a modified form of the invention; Fig. 9, a vertical sectional view along line 9—9 of Fig. 8; Fig. 10, a view similar to Fig. 9, showing the closure means in open position; Fig. 11, a sectional view along line 11—11 of Fig. 9; Fig. 12, an enlarged detail of the closure latch in closed position; Fig. 13, a similar view showing the latch in released position; Fig. 14, an enlarged detail of the closure-retracting mechanism in latched position; and Fig. 15, a view similar to Fig. 14 in released position.

Describing the embodiment illustrated in Figs. 1–7D, inclusive, A indicates a casing of any suitable structure equipped with a partition A' adapted to contain autographic register means B including a record compartment C having locking mechanism C', and a cash compartment D having a closure member D' equipped with latching means, and E, a deposit chamber openable through the compartment C.

A detailed description of the register means B of the device need not be presented here, since this mechanism is known in the art and invention is not here attributed to the register means specifically but only as it cooperates with the improved cash receptacle. Accordingly, only those features of the register cooperating with the cash deposit mechanism will be described. The register mechanism and initial feed mechanism illustrated herein are described in detail in Jensen Patent No. 1,595,080.

Suffice it to say that the register B is provided with a platen 16 over which stationery strips 16$^a$ having register perforations 16$^b$ may be led. A rock shaft 17 is shown equipped with register pins 17$^a$, which are yieldingly urged upwardly into engagement with the register perforations 16ᵇ, and is thereby adapted upon oscillation by a hand lever 18 at the side of the casing to align and feed the stationery forwardly to a position where the stationery may be grasped by hand and a form length withdrawn.

The cash compartment D may be of any suitable form and equipped with any suitable device for retaining coins, bills, and the like. In the present embodiment, two trays are employed, a lower tray 19 equipped with pivoted bill-retaining arms 19ᵃ, and an upper drawer 20 presenting coin compartments 20ᵃ. To render available the contents of the lower bill tray, the upper drawer 20 is preferably slidably mounted on suitable guides 21.

The compartment D is equipped with an upwardly opening closure D' having depending blinds 23 adapted to shield the contents of the cash drawer when the closure is open. The closure is pivotally mounted on a bar 24 fixedly secured in the mid-section of the casing A. Coil springs 25 encircle the bar and tend to urge the closure member D' to its open position.

The closure raising and latching device may be of any suitable form. The mechanism shown is well adapted for the purpose. As shown in Figs. 3 and 4, it comprises an arm 26 fixed to the rock shaft 17 and slidably engaged in a slot 27 in the upper portion of a vertical link 28 by a pin 29. The lower end of the link 28 is pivoted to an arm 30 fixed to a transverse shaft 31 suitably journaled adjacent the bottom of the cash compartment D. Thus, the link 28 has a lost-motion connection with the arms 26 and 30.

A bar 32 having a laterally projecting lug 33 positioned to engage the edge of the closure blind when the closure member is moved to its closed position is slidably mounted in suitable guides 34 in the partition A'. The rear end of the bar is secured to a coil spring 35 adapted to vigorously urge the bar to its foremost position. However, this member is only effective to partially open the closure, the remainder of the movement being influenced only by the coil springs 25.

A latching device is shown as comprising arms 36 fixedly secured to the shaft 31 and presenting hooked ends 37 adapted to releasably engage studs 38 projecting from a lower portion of the closure flange, when the closure member is moved into its closed position. It will be understood that when the cover is lowered, the bar is pushed to its forward position and the closure latched by engagement of the hooked cam and the stud. Upon oscillation of the shaft 31 at the end of the movement of the shaft 17, the latching mechanism is released by elevation of the hook and the cover urged upwardly by the bar. It is to be understood however that the invention is not limited to the particular feed mechanism shown.

A key-operable latch-controlling device may also be provided. As shown, this device comprises a key-extension shaft 39 suitably journaled in brackets 40 secured to the drawer guide 21 and is oscillatable by a key 41 adapted to be inserted through a keyhole in the front of the casing. The shaft 39 is provided near its rear end with a pin 42 adapted to engage a perforation 43 in the closure-blind and lock the closure-member in closed position when the key 41 is turned counter-clockwise. The shaft is provided with an additional pin 44 in rear of the pin 42 and is disposed at right angles thereto so as to contact the underside of a lug 45 (see Fig. 1) extending laterally from one of the hooked arms 36. By turning the key a quarter of a revolution to the right, from its unlocked position, the pin 44 will raise the arm 36 and permit the closure member to spring open.

Thus it will be understood that when the key-shaft is in its normal or neutral position, it does not interfere in any way with the opening of the cover by the operation of hand lever 16 of the register mechanism. However, the cover may be opened any time by turning the key clockwise, but by turning the key counter-clockwise, the cover will be locked so that it cannot be opened through the operation of the hand lever of the register mechanism.

The deposit chamber E disposed in rear of the cash compartment likewise has a latched cover E' equipped with a knob 46. Any suitable latch means, releasable only from within the record compartment, may be provided. As shown in Figs. 3 and 6, a rock shaft 47 is journaled in brackets 48 on the underside of the cover E' near its front edge. A latch 49 having a hooked end 49ᵃ is mounted on the rock shaft so as to engage a fixed stud 50, on the casing wall A', and lock the cover E'. A coil spring 47ᵃ yieldingly urges the latch to its stud-engaging position. A trigger slide 51 is movably mounted on the wall A' and has a lug 52 adapted to disengage the latch 49 from the stud 50. The trigger slide has an operating arm 53 extending through a slot 54 into the record chamber of the register. Accordingly, it will be readily understood that the cover can only be unlocked from within the record chamber.

A brief description of the operation will suffice. Normally, the cover in it is in its closed position, as shown in Figs. 1 and 2. After the salesman has made his entry on the sales slip, the hand lever 18 may be depressed to advance initially the sales slips to a position where they may be gripped and withdrawn by hand across the platen. At the end of the stroke of the rock shaft 17, the latching mechanism is released and the cover urged upwardly by the spring device described. The cover may be locked independently of the register-actuating mechanism by turning the key-controlled shaft 39 a quarter of a revolution in a counter-clockwise direction from its unlocked position. Similarly, the cover may be released from its closed-unlocked position by turning the shaft a quarter of a revolution clockwise from its operative position.

In the modification illustrated in Figs. 8 to 15, inclusive, A² indicates a casing containing autographic register means B, having a record compartment C and a cash compartment D² equipped with a rolled top cover D³ having a suitable latch and retracting means. The casing recording means and record compartment are similar to that previously described. In the present embodiment, the cash compartment is provided with a single tray 60 suitably disposed on brackets 61 and has coin compartments 60ᵃ and bill compartments 60ᵇ.

The front end portion of the cash drawer is preferably supplied with a resilient coin-guide strip 60ᶜ yieldably mounted above the front end portion of the drawer to prevent coins from slipping into the front of the compartment or getting caught under the upper portion of the front wall of the casing while being slid out from the front coin compartment. The rolled top is preferably comprised of a plurality of metal slats 61' pivotally connected. For example, the slats may be supplied with a pair of overlapping alined flanges 61ᵃ depending from the strips and secured together by pins 61ᵇ. The rolled top is slidably mounted on guide walls 62 and when the cash compartment is open, the rolled top is disposed beneath the cash tray 60 on guides 63 set in the bottom of the casing. One of the rear slats 61c, when the rolled top is closed, is provided on its underside with depending lugs 61g for a purpose to be described. Similarly, one 61d of the front slats is provided with a handle member 61e and on its lower side, with forwardly extending hooks 61f.

The closure latch may be of any suitable form and is preferably released by the register-actuating mechanism. The means shown is well adapted for the purpose. The register is equipped with a manually operated rock shaft 64 adapted to initiate the advance of the stationery strips across the platen as described in Jensen Patent No. 1,959,080. An arm 65 fixed to the rock shaft 64 at a point between the register means and cash compartment is slidably engaged in a slot 66 at one end of the link 67. The other end of the link 67 is pivotally connected to an arm 68 fixedly depending from the shaft 69 suitably journaled in the upper front portion of the guide walls 62. The shaft 69 is equipped with hooked cams 70 adapted to releasably engage the hook arms 61f on the strip 61d.

A bell warning means operable on opening and closing the rolled top may be provided. As shown, a bell 71 is disposed on the bottom of the casing and adjacent thereto is a knocker 72 mounted on a leaf spring 72a. An arm 73 depends from the rock shaft 69 and is provided with a pawl 73a pivotally mounted thereon to engage a cam surface of the striker 72 and move it laterally into striking position when the arm is urged forwardly. The pawl enables the arm to return to its normal position without moving the striker. It will be understood that the bell is rung whenever the rolled top is latched or unlatched.

Suitable closure retracting means is shown in Figs. 9, 10, 14 and 15 and, as shown, comprises a shaft 74 suitably journaled in the guide walls 62. Fixedly secured to the shaft 74 are a pair of arms 75 presenting shoulder portions 75a adapted to engage the flange portion 61g depending from the strip 61c and be turned to the vertical position indicated in Fig. 7 when the rolled top is moved into its closed position. Strong coil springs 76 encircle the shaft 74 and are adapted to vigorously urge the arms 75 rearwardly when the latch is released. A stop 77 protrudes from the guide wall to limit the rearward movement of the arms 75 to about 50° from vertical.

The operation of the improved cash receptacle device will be readily understood. After the salesman has completed his entry, the stationery strip is advanced on the platen by depressing the handle controlling the shaft 64. The latter part of the movement of the shaft disengages the latching members 61f and 70, whereby the rolled top is advanced a short distance by the retracting means described. At the same time, the bell is rung.

The foregoing description has been given for clearness of understanding only, and no unnecessary limitations should be understood therefrom, but the appended claims should be construed as broadly as permissible, in view of the prior art.

What I claim as new, and desire to secure by Letters Patent, is:

In a machine of the character set forth: a box like cash compartment having a cover hinged to swing upwardly thereon, said cover being provided with downwardly extending side blinds to obscure partially, lateral observation of the contents of said compartment when the cover is open, and releasable means for holding said cover closed.

JOHN E. EUTH.